(12) United States Patent
Koller et al.

(10) Patent No.: US 8,233,888 B1
(45) Date of Patent: Jul. 31, 2012

(54) LEVERAGING MOBILE-DEVICE ANALYTICS FOR INFORMING AND CALL HANDLING

(75) Inventors: Gary Duane Koller, Overland Park, KS (US); Simon Youngs, Overland Park, KS (US); Piyush Jethwa, Overland Park, KS (US); Mark Douglas Peden, Olathe, KS (US); Raymond Emilio Reeves, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 12/909,448

(22) Filed: Oct. 21, 2010

(51) Int. Cl.
*H04M 1/725* (2006.01)

(52) U.S. Cl. .................. 455/412.1; 455/414.1; 455/415; 455/418

(58) Field of Classification Search .............. 455/412.1, 455/412.2, 414.1, 421, 432.3, 434, 435.1, 455/513, 566, 567, 413, 418
See application file for complete search history.

(56) References Cited

U.S. PATENT DOCUMENTS

| | | | |
|---|---|---|---|
| 7,551,920 B1 * | 6/2009 | Ngan | 455/417 |
| 7,565,230 B2 * | 7/2009 | Gardner et al. | 701/35 |
| 8,013,786 B2 * | 9/2011 | Gildea | 342/357.35 |
| 2006/0003813 A1 * | 1/2006 | Seligmann et al. | 455/567 |
| 2006/0246878 A1 * | 11/2006 | Khoury | 455/412.2 |
| 2007/0165821 A1 * | 7/2007 | Altberg et al. | 379/210.02 |
| 2007/0176742 A1 * | 8/2007 | Hofmann et al. | 340/7.6 |
| 2008/0242271 A1 * | 10/2008 | Schmidt et al. | 455/414.1 |
| 2009/0086947 A1 * | 4/2009 | Vendrow | 379/201.12 |
| 2009/0112708 A1 * | 4/2009 | Barhydt et al. | 705/14 |
| 2009/0156265 A1 * | 6/2009 | Sweeney et al. | 455/567 |
| 2010/0293247 A1 * | 11/2010 | McKee et al. | 709/218 |

\* cited by examiner

*Primary Examiner* — Jean Gelin (57) ABSTRACT

Computer-readable media and methods are provided for utilizing analytics collected by a mobile device to inform a user and to implement rules that instruct the mobile device on handling of calls. Analytics that include data about calls made and received by the mobile device are collected by the mobile device. An application on the mobile device uses the analytics to rank callers and provides the rankings to the user. A rule is received by the mobile device that indicates how to handle inbound and outbound calls based at least on the rankings. The analytics and rules are also useable for promotional purposes and can be shared with other services.

15 Claims, 9 Drawing Sheets

LEVERAGING MOBILE-DEVICE ANALYTICS FOR INFORMING AND CALL HANDLING

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

Embodiments of the invention describe computer-readable media, methods, and systems for using analytics captured by a mobile device to inform a user of the mobile device about the analytics data and/or to implement rules for handling calls to and from the mobile device. Analytics are captured by the mobile device and include any available data and information about calls placed and received by the mobile device. The analytics also include information about data communications transmitted and received by the mobile device, e.g. text messages. The analytics are processed by an application and presented on the mobile device to provide information to the user of the mobile device such as by providing rankings of callers and collective call data for a particular caller.

Based on the analytics, rules are constructed that indicate how the mobile device is to handle calls from a respective caller. For example, a call received from a caller that is ranked in the top ten most called may be handled by providing a unique ringtone while a call received from a caller that is not ranked in the top ten might be handled by providing only a vibrating alert or a silent alert.

Additionally, the analytics can be shared with other services, such as promotional services or social networking sites. And a network carrier of the mobile device or another service might utilize the analytics to base provisioning of promotional offers and other features.

DESCRIPTION OF THE DRAWINGS

Illustrative embodiments of the invention are described in detail below with reference to the attached drawing figures, and wherein.

DETAILED DESCRIPTION

The subject matter of embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the invention. The following is a list of these acronyms:

| | |
|---|---|
| CNAM | Caller Name |
| GPRS | General Packet Radio Service |
| GSM | Global System for Mobile Communications |
| PDA | Personal Data Assistant |
| MMS | Multimedia Message Service |
| MSN | Mobile Switching Network |
| NID | Network Identification |
| PCS | Personal Communications Service |
| RAN | Radio Access Network |
| SID | System Identification |
| SMS | Short Message Service |
| UMB | Ultra Mobile Broadband |
| UMTS | Universal Mobile Telecom. System |
| WAP | Wireless Access Protocol |
| 3G | Third Generation |
| 3GPP | Third Generation Partnership Project |

Further, various technical terms are used throughout this description. An illustrative resource that fleshes out various aspects of these terms can be found in *Newton's Telecom Dictionary* by H. Newton, 24th Edition (2008).

Embodiments of the invention describe computer-readable media, methods, and systems for leveraging mobile device analytics on a mobile device and invoking rules based on the analytics. As used herein, mobile device analytics include any data and information about a caller, call recipient, their respective devices, and the call itself. For example, analytics might include a caller's name (CNAM), network identification (NID), system identification (SID), call duration, whether the call is inbound/outbound, mobile originated or mobile terminated, call start/stop time, call duration, whether the call was a voice or data communication, and the like. Analytics might also include call disposition, e.g. whether the call was connected successfully, blocked, or connected to voice mail, among a variety of others. The analytics described above are intended to be exemplary of analytics that might be collected and used; the above description is in no way intended to limit the types of analytics that can be collected or used in embodiments of the invention.

In an embodiment, tangible computer-readable media having computer-executable instructions embodied thereon that, when executed, perform a method for leveraging mobile device analytics on a mobile device is described. Mobile device analytics are collected by a mobile device. The mobile device analytics include data related to calls received and made by the mobile device. A call includes both voice and data communications. The analytics are stored in a memory of the mobile device. Metrics are provided to a mobile device. Callers of the mobile device are ranked base on one or more of the metrics and a ranking of the callers is presented on the mobile device. The callers include inbound callers and outbound call recipients.

In another embodiment, a computer-implemented method on a mobile device for invoking a rule for handling an incoming call or message is described. A ranking of callers to the mobile device is generated by an application residing thereon. The callers include inbound callers and outbound call recipients and a call is inclusive of voice and data communications. A rule that defines how incoming calls from the callers are to be handled by the mobile device based on a respective caller's rank in the ranking is received by the mobile device. An incoming call from a first caller is received; the first caller is one of the callers. The first caller's rank in the ranking is identified. The incoming call is handled based on the rule with respect to the first caller's rank in the ranking.

In another embodiment, a computer-implemented method on a mobile device for using mobile device analytics to inform treatment of an incoming call or message based on a user-defined rule is described. Mobile device analytics are collected by a mobile device. The analytics include data related to calls received and made by the mobile device and a call includes both voice and data communications. Callers of the mobile device are ranked by an application residing on the mobile device based on the analytics. The callers include inbound callers and outbound call recipients. A user-defined rule that defines how incoming calls from the callers are to be handled by the mobile device based on a respective caller's rank in the ranking and a time of day of the incoming call is received. A first incoming call from a first caller is received; the first caller is one of the callers. The first caller's rank in the ranking is identified. A time of day of the first incoming call is determined. The incoming call is handled by the mobile device based on the rule with respect to the first caller's rank in the ranking and the time of day of the first incoming call.

Embodiments of the invention may be embodied as, among other things: a method, system, or set of instructions embodied on one or more computer-readable media. Computer-readable media are non-transitory media, include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
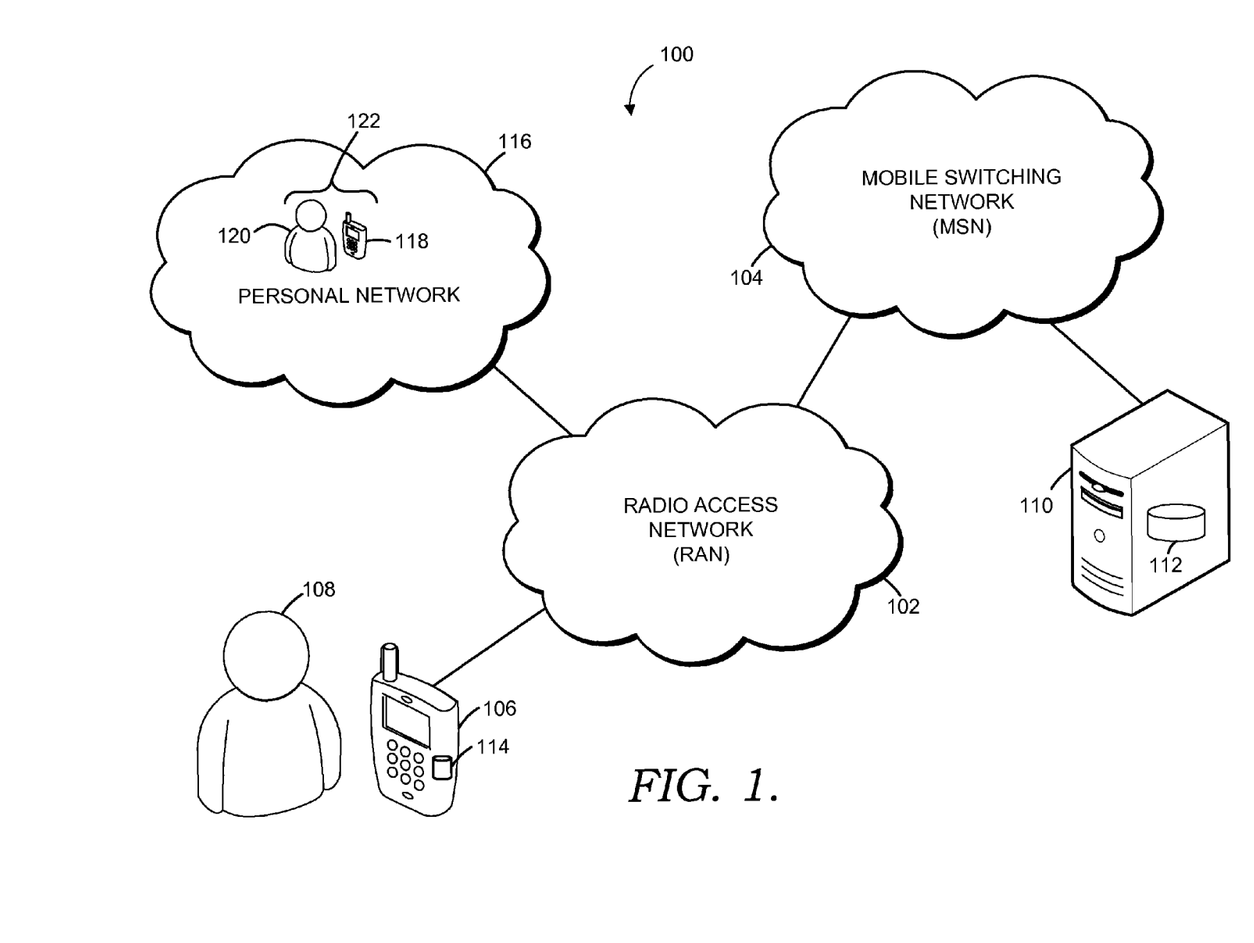
FIG. 1 is a block diagram depicting an exemplary network environment that is suitable for use in accordance with an embodiment of the invention.

Referring initially to FIG. 1, an exemplary network environment 100 that is suitable for use in accordance with an embodiment of the invention is described. The network environment 100 depicted in FIG. 1 is only one exemplary environment, of which there may be many, suitable for implementing embodiments of the invention. Further, the components depicted in FIG. 1 are depicted singularly for clarity and are provided with names for reference, but one of ordinary skill in the art will recognize that a plurality of similar components may be used in application and that the nomenclature for the components may change without distracting from the functions described herein with respect to implementation of embodiments of the invention. For example, a network may have millions of mobile devices that it serves. Further, the nomenclature applied to a particular component in the environment 100 may change with respect to functions being performed thereby.

The network environment 100 embodies any wireless-telecommunications network capable of receiving, processing, and delivering voice and data such as for example, and not limitation, voice calls, text messages, short message service (SMS) messages, multimedia messaging service (MMS) messages, and e-mail. Communications over the wireless network are completed by any available standards or protocols including Global System for Mobile communications (GSM), Universal Mobile Telecommunications System (UMTS) Third Generation (3G), Personal Communications Service (PCS), or Ultra Mobile Broadband (UMB), among others. As used herein, the terms wireless-telecommunications network, telecommunications network, or simply, network are used interchangeably and are intended to illustrate any communications network suitable for communicating voice or data to one or more mobile devices. Such networks include various wired and wireless components as is known in the art. Additionally, a carrier network, as referred to herein, is descriptive of a network to which a mobile device is subscribed or that is primarily responsible for providing communications services to the mobile device.

The network environment 100 includes a radio access network (RAN) 102, a mobile switching network (MSN) 104, a mobile device 106, and a user 108 of the mobile device 106. The RAN 102 represents any wireless access network now known or later developed that provides wireless access to a communications network for the mobile device 106. The RAN 102 includes various components necessary for implementing wireless communications such as, for example and not limitation, base stations, switches, routers, servers, and resource locators, among others (not shown in FIG. 1). Such is not intended to indicate the inclusion or exclusion of such components from the network environment 100 and the RAN 102. The depiction of FIG. 1 is presented in a simplified form so as not to unnecessarily complicate description of embodiments of the invention.

The mobile switching network 104 provides any desired services to the network environment 100 for communicating voice and data between two or more mobile devices and between a mobile device and a system of a carrier network of the mobile device or a system of another network. The MSN 104 includes various components (not shown) such as, for example and not limitation, service centers, switches, routers, servers, databases, and resource locators, among others. Again, such is not intended to indicate the inclusion or exclusion of such components from the network environment 100 and the MSN 104. In an embodiment, the MSN 104 and the RAN 102 are integrated into a single operational entity.

The MSN 104 is in communication with or includes an operations server 110. The operations server 110 is any computing device such as workstation, server, laptop, hand-held device, and the like. The operations server may include one or more of a bus, a memory, a processor, a presentation component, input/output ports, input/output components, and an illustrative power supply, among other components known in the art. The operations server 110 is configured to provide services to the mobile device 106, such as storing mobile device analytics, generating rules for implementation by the mobile device 106, providing promotional offers to the mobile device 106, communicating mobile device analytics to other servers on the same or other networks (not shown), and the like. In an embodiment, the operational server 110 includes a database 112 that is configured to store mobile device analytics, rules, and promotional offers as described more fully below.

The mobile device 106 is any available mobile device capable of placing and receiving voice calls and/or sending and receiving data, such as text messages. The mobile device 106 includes, for example and not limitation, any wireless phone, cellular phone, personal digital assistant (PDA), BlackBerry® device, wireless enabled media player, or other device configured to communicate over a wireless network. Such communication may be voice or data and may utilize services and protocols to enable short message service (SMS) messaging, text messaging, email, packet switching for Internet access, and multimedia messaging service (MMS) messaging, among others.

Short message service (SMS) is a widely used communications protocol for exchanging messages, often referred to as text messages, between two or more electronic devices. Typically, the devices are wireless mobile devices, such as the mobile device 106, and are configured to generate and receive SMS messages. SMS messages are short strings of text that allow users to communicate. The text strings may be limited to a maximum of 160 7-bit text characters, or less per SMS message.

Multimedia messaging service (MMS) is a telecommunications standard for sending and receiving messages that may include text, rich text, images, audio, video, or other data. MMS may utilize Third Generation Partnership Project (3GPP) and wireless application protocol (WAP) standards as well as general packet radio service (GPRS), among other wireless-network technologies to communicate multimedia messages to a recipient mobile device. Other forms of messages, such as an e-mail, may be composed and sent from computing devices, such as a personal computer, and then communicated to a recipient mobile device as an MMS message.

In an embodiment of the invention, the mobile device 106 includes an application 114 stored in a memory therein and executed by a processor in the mobile device 106. The application 114 is configured to, among other things, collect, process, and present mobile device analytics as well as to perform various tasks for handling calls to the mobile device as described more fully below. In an embodiment, more than one application 114 is provided on the mobile device 106 to perform one or more of the above described functions. In another embodiment, the application 114 is or includes one or more widget applications.

The environment 100 also includes a personal network 116 that includes a plurality of caller's mobile devices 118 with respective users 120. The mobile devices 118 and the users 120 are collectively referred to hereinafter as callers 122 for sake of clarity. It is understood that the users 120 communicate with the user 108 via their respective mobile devices 118 and 106. It is also to be understood that although the mobile devices 118 and users 120 are referred to as callers 122, such is not intended to limit communications between the callers 122 and the mobile device 106 to inbound calls to the mobile device 106; calls between callers 122 and mobile device 106 include inbound and outbound calls from the mobile device 106. Also, a call is also understood herein as inclusive of a data communication, e.g. a text message.

The personal network 116 is comprised of a group of the callers 122 that have communicated with the mobile device 106 via voice or data communications and callers that might be listed in an address book of the mobile device 106. In an embodiment, the personal network 116 is a virtual construct, e.g., a listing of the callers 122, and is not embodied in a physical grouping. For example, the personal network 116 might be similar to a calling circle or a friends and family grouping as is known in the art, but includes all or a portion of callers 122 to the mobile device 106. In an embodiment, the inclusion of callers 122 in the personal network 116 is dependent on one or more characteristics such as, for example and not limitation, a ranking of the callers 122, a rule, a number of times a caller 122 has called the mobile device 106, a time since a last time the caller 122 called the mobile device 106, and preferences of the user 108.

Turning now to FIGS. 2A-D, a method 200 for presenting mobile device analytics on a mobile device in accordance with an embodiment of the invention is described. At a step 202, a mobile device, such as the mobile device 106, collects mobile device analytics. The analytics are collected for calls and data received by the mobile device from a caller. In an embodiment, the analytics also include data for/about calls placed by the mobile device. As described above, the analytics can include information about the caller, the call, and/or the call recipient. In an embodiment, an application installed on and executed by the mobile device collects the analytics. In another embodiment, an application is executed at a server on a carrier's network to collect analytics for the mobile device.

Figure 2A:
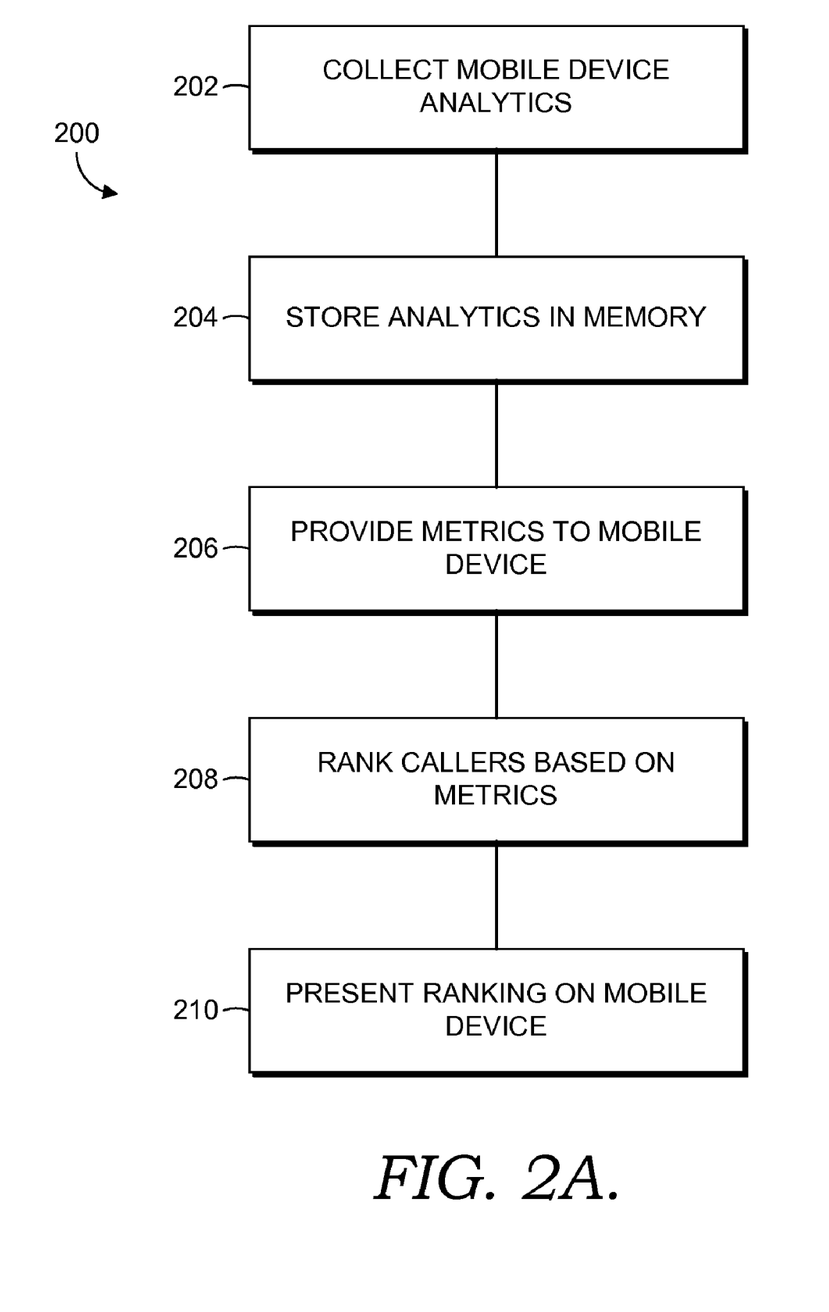
FIGS. 2A-D are block diagram depicting a method and optional additional steps for presenting mobile device analytics on a mobile device in accordance with an embodiment of the invention.

At a step 204, at least a portion of the analytics is stored in a memory on the mobile device. All or a portion of the analytics may also be communicated to systems of a carrier network, such as the operations server 110 and the database 112, and to systems of another network or service. Metrics for measuring or quantifying the analytics are provided, at a step 206. The metrics are provided to the mobile device by the network carrier or might be generated by the user of the mobile device via the application residing on the mobile device. The metrics include categories, standards, or other characteristics of the analytics data that are useable to rank, measure, or quantify the callers based on the analytics.

The metrics are employed to rank the callers based on the collected analytics, at a step 208. In an embodiment, metrics are chosen automatically by an application on the mobile device to rank the callers in one or more ways. A user might also select one or more metrics by which to rank the callers. The metrics are useable singularly to rank the callers or more than one metric might be used in combination to generate a ranking.

The callers can be ranked in any desired manner. For example, the callers might be ranked highest to lowest based on a total number of calls, a total duration of calls, or a number of text messages, among a variety of other rankings. Additionally, the metrics are automatically employed by the application residing on the mobile device to automatically rank the callers. In an embodiment, the callers are automatically ranked or re-ranked when new analytics are collected, e.g. after the completion of a call. Or the ranking/re-ranking is completed at a pre-determined interval. In another embodiment, the user selectively ranks the callers based on one or more criteria selected from the collected analytics and metrics.

For example, a user might rank callers based on both the total number of times the each of the callers has called the user and on how long it has been since the caller last called the user. Thus, callers that have called the user many times but that have not called recently may not be ranked as highly as a caller that has called fewer times but more recently. Such allows a user to tailor a ranking as desired to make the ranking relevant and useful to their circumstance.

At a step 210, the ranking of the callers is presented to the user on the mobile device. The ranking is presented in any desired manner or format such as, for example, and not limitation, a listing, a histogram, a chart, a numeral designation associated with each caller's name/information, or the like. In an embodiment, the ranking is stored to a memory in the mobile device or at a server in addition or in the alternative to being presented to the user.

Figure 2B:
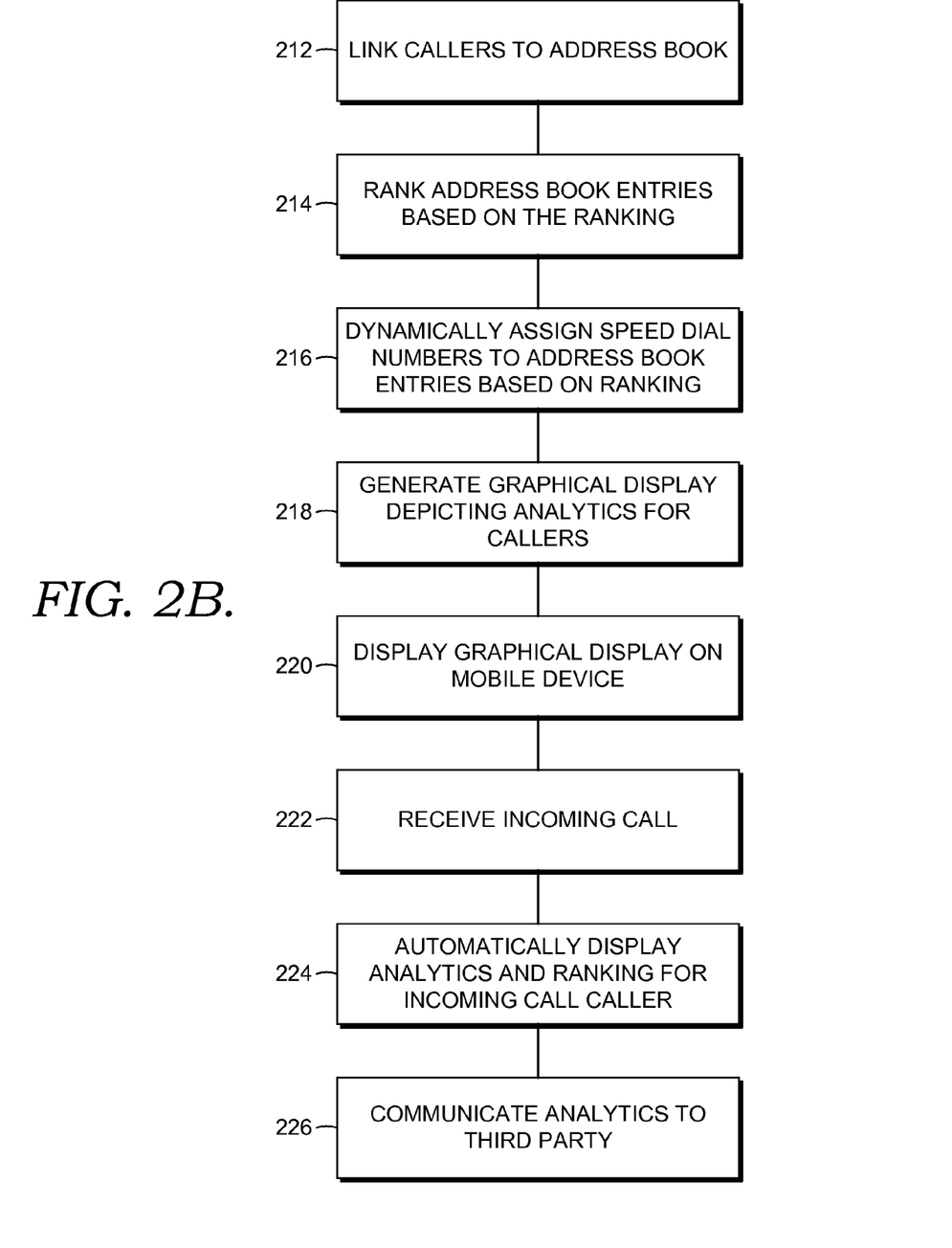

With reference to FIG. 2B, additional steps 212-226 are described in accordance with an embodiment of the invention. Steps 212-226 are employed in any order or not at all as desired in embodiments of the invention. At a step 212, the callers for which analytics have been collected are linked to an address book or contacts list stored on the mobile device or at a server of the carrier network. As such, contacts in the address book that correlate with the callers are ranked based on the ranking of the callers, at a step 214.

At a step 216, the ranking of the address book contacts is employed to dynamically assign speed dial assignments based on the ranking. For example, an address book contact that is ranked as having the most calls to the mobile device might be assigned to a speed dial number "1." Speed dial assignments are understood as providing a shortcut or simplified and highly accessible way of dialing a number assigned to a respective speed dial number.

At a step 218, the application residing on the mobile device generates a graphical display depicting the ranking of one or more of the callers and, at a step 220, presents the graphical display on a display of the mobile device. In an embodiment, a user selectively alters the graphical display by choosing criteria on which it is based.

An incoming call is received by the mobile device at a step 222. The mobile device or an application executing thereon identifies the caller or source of the incoming call and automatically displays on the mobile device one or more of the ranking of the caller and analytics that have been collected for the caller, at a step 224.

Figure 5:
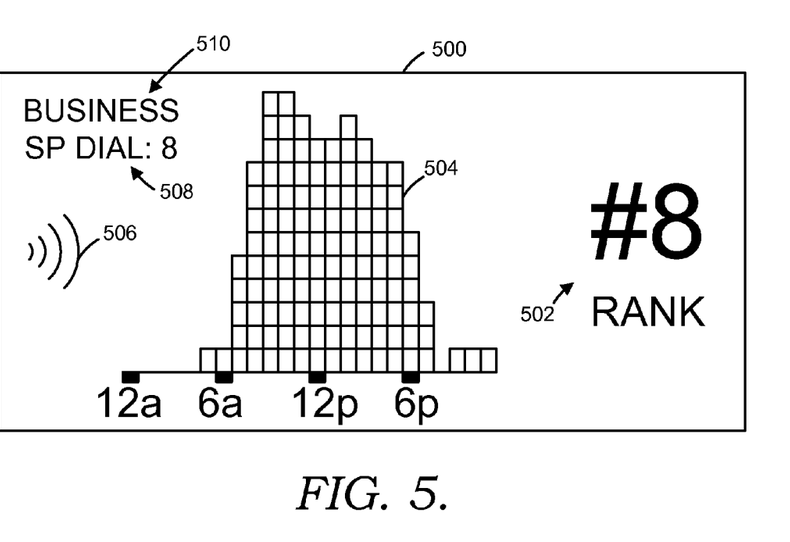
FIG. 5 is a graphical representation of an exemplary graphical display that is presented by a mobile device in accordance with an embodiment of the invention.

An exemplary graphical display 500 that might be provided is depicted in FIG. 5. The graphical display 500 is just one exemplary display, of which there are many, and is not intended, in any way, to limit the graphical display that might be provided in embodiments of the invention. In an embodiment, the display 500 is presented when an incoming call is received or the display is provided in association with respective entries in an address book on the mobile device. The display 500 includes a rank indicator 502, a call history histogram 504, an alert type indicator 506, a speed dial assignment indicator 508, and a caller category indicator 510. The rank indicator 502 provides a visual indication of a rank that the caller has been given based on the collected analytics and metrics.

The call history histogram 504 provides a histogram of calls to/from the caller with respect to the time of day of the calls. As is depicted in FIG. 5, calls from this caller are typically made between 6 A.M. and 6 P.M. with a slightly higher frequency in the morning hours. In an embodiment, the histogram is configured to depict only successful calls to/from the caller or to depict unsuccessful calls (e.g. calls that were sent to a voicemail system) to/from the caller.

The alert type indicator 506 indicates a type of ring tone that is assigned to be provided when the mobile device receives a call from this caller. For example, the indicator 506 might indicate that a silent, vibrating, or specialized ringtone is to be provided.

The speed dial assignment indicator 508 shows an assigned speed dial number that is useable to quickly contact the caller. In depicted embodiment, the assigned speed dial number correlates with the caller's rank depicted by the rank indicator 502.

The caller category indicator 510 depicts one or more categories into which the caller has been placed by the user or an application on the mobile device. As such, a user that is presented with the display 500, as depicted in FIG. 5, might quickly recognize that the caller is an important business contact that is usually most easily contacted during normal business hours.

With continued reference to FIG. 2B, all or a portion of the analytics for the mobile device are communicated to a third party, at a step 226. The analytics are communicated by the mobile device directly to the third party such as via a BLUETOOTH shortwave radio transmission, or are communicated through one or more networks, such as network 100. In an embodiment, the analytics are communicated by a server on the network (e.g. operations server 110 on network 100) to the third party. In another embodiment, the analytics are communicated as a file, such as a comma-separated values file (*.csv) as known in the art.

The third party includes any user, server, service provider, or other entity other than the user of the mobile device or the carrier providing service to the mobile device. For example, the third party might be a social networking service, a research service, or a marketing/promotional service. In an embodiment, the analytics are communicated to a social networking service like FACEBOOK or TWITTER. The social networking service uses the analytics to rank a user's friends in their social networking profile or to populate the information on the user's web page on the social networking website, among other uses. In another embodiment, a user releases the analytics to a marketing service that consumes the data in order to market products or services to the user or pays the user for the information. The analytics may be communicated to the third party automatically or the user can initiate the communication. Additionally, in an embodiment, the user can select the third parties and portions of the analytics that are to be communicated thereto.

Figure 2C:
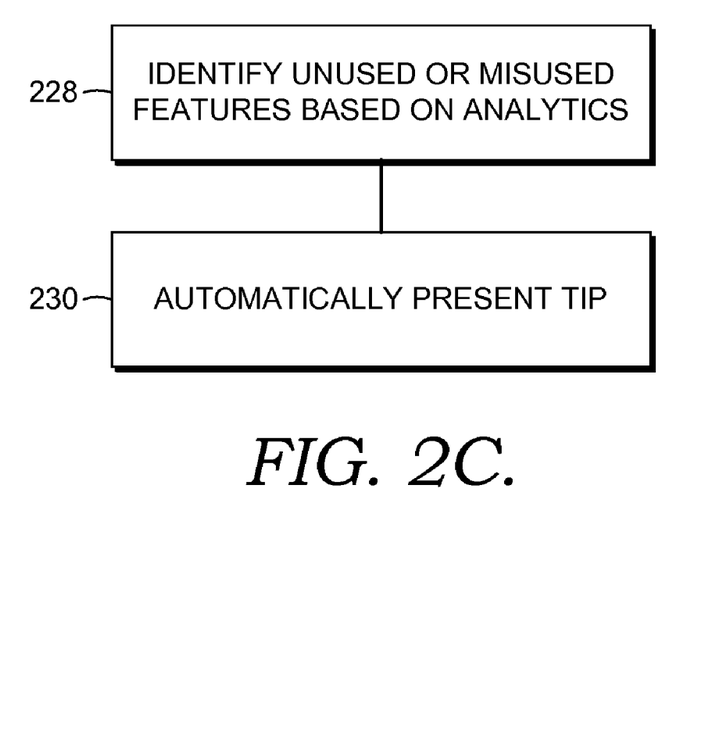

With additional reference now to FIG. 2C, one or more features are identified as not being fully utilized, at a step 228. The features are identified by a server of the carrier network or of a third party or an application executing on the mobile device. The features include any feature or function provided by the mobile device or other server that is useable on the mobile device and that is one or more of not being used, not being fully used, or being incorrectly used. Information regarding the feature and how to use the feature is automatically provided to a user or the mobile device as a tip, at a step 230. A tip includes a short instructional document, audio file, video file, or other form of communication known in the art. The tip can be provided by any means such as, for example and not limitation, a text message, an email, a voice message, a multimedia message, and the like.

For example, a user might not know or understand how to address a text message to more than one recipient at a time and may be sending multiple separate text messages with the same text to multiple different recipients/callers. This nonuse of a feature that allows addressing a single text message to multiple recipients is identified and a tip that includes an indication that the feature exists and directions for how to use the feature are provided to the user via the mobile device.

Figure 2D:
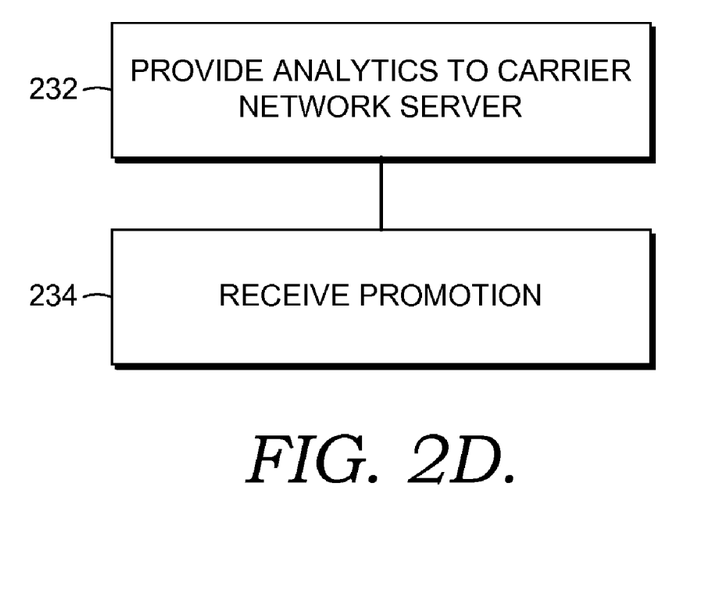

With reference to FIG. 2D, the analytics are provided by the mobile device to a server of the carrier network (such as operations server 10 of network 100), at a step 232. In an embodiment, the analytics are not provided to the carrier network server. At a step 234, one or more promotional offers are received by the user of the mobile device. The promotional offers are based on the analytics received from the mobile device. In an embodiment, the promotional offers are not based on the analytics received from the mobile device but employ rules and rankings produced by the mobile device based on the analytics. A promotional offer might include free calls to callers ranked in the top ten on a mobile device or a certain percentage off the cost of calls to callers identified in the user's personal network (e.g. personal network 116). For example, a carrier can offer a "Happy Hour" promotion that allows a user to call any caller ranked in the user's top ten between 5:00 PM and 7:00 PM for free. Or the carrier might give a user a free multimedia message to top ten caller without a charge for the data usage. The promotions might be configured to promote a user's usage of services provided by the carrier network that are unused, underused, new, or the like, such as international calling or mobile-to-mobile calling.

Figure 3A:
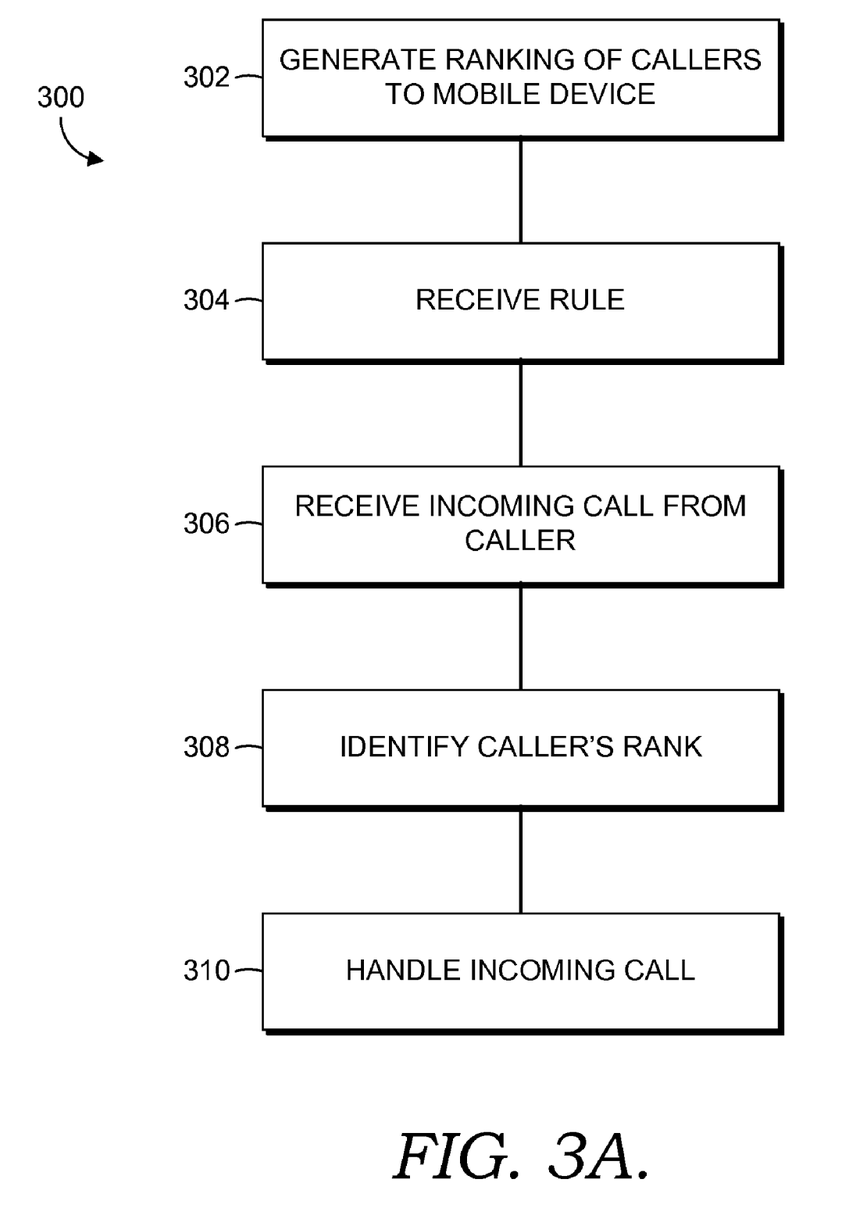
FIG. 3A is a block diagram depicting a method for invoking a rule for handling an incoming call or message in accordance with an embodiment of the invention.

Turning now to FIG. 3A, a method 300 for invoking a rule for handling an incoming call or message in accordance with an embodiment of the invention is described. At a step 302, a ranking of callers to a mobile device is generated. At a step 304, a rule is received from a user or from a carrier network server such as server 110. The rule instructs the mobile device how incoming calls are to be handled based on a rank of a caller associated with the incoming call. For example, the rule can identify a type of alert or ringtone that is to be provided by the mobile device for a caller or, the rule can instruct the mobile device to automatically send a call to voice mail or automatically provide a data message (e.g., a text message) to a user or caller. Additionally, a rule might instruct the mobile device to invoke a function of the mobile device such as, for example, and not limitation, blocking the call, withholding a caller's name or other information, and forwarding the call to another number. There are a variety of functions and options for handling calls that can be invoked by the rule; it is understood that the above examples are not intended to limit those functions and options. In an embodiment, a rule can also apply to outgoing calls made by the mobile device.

At a step 306, an incoming call is received by the mobile device from a caller. The incoming call comprises a voice call or a data communication. The caller's rank is identified, at a step 308. The caller's rank is identified by an application running on the mobile device or by an application running on a server of the carrier network. At a step 310, the call is handled as instructed by the rule as it applies to the caller based on the caller's rank. For example, where the rule provides two options for handling a call, the first applying to callers ranking in the top ten and the second applying to callers ranking below the top ten, the appropriate option is employed based on the callers identified rank.

Figure 3B:
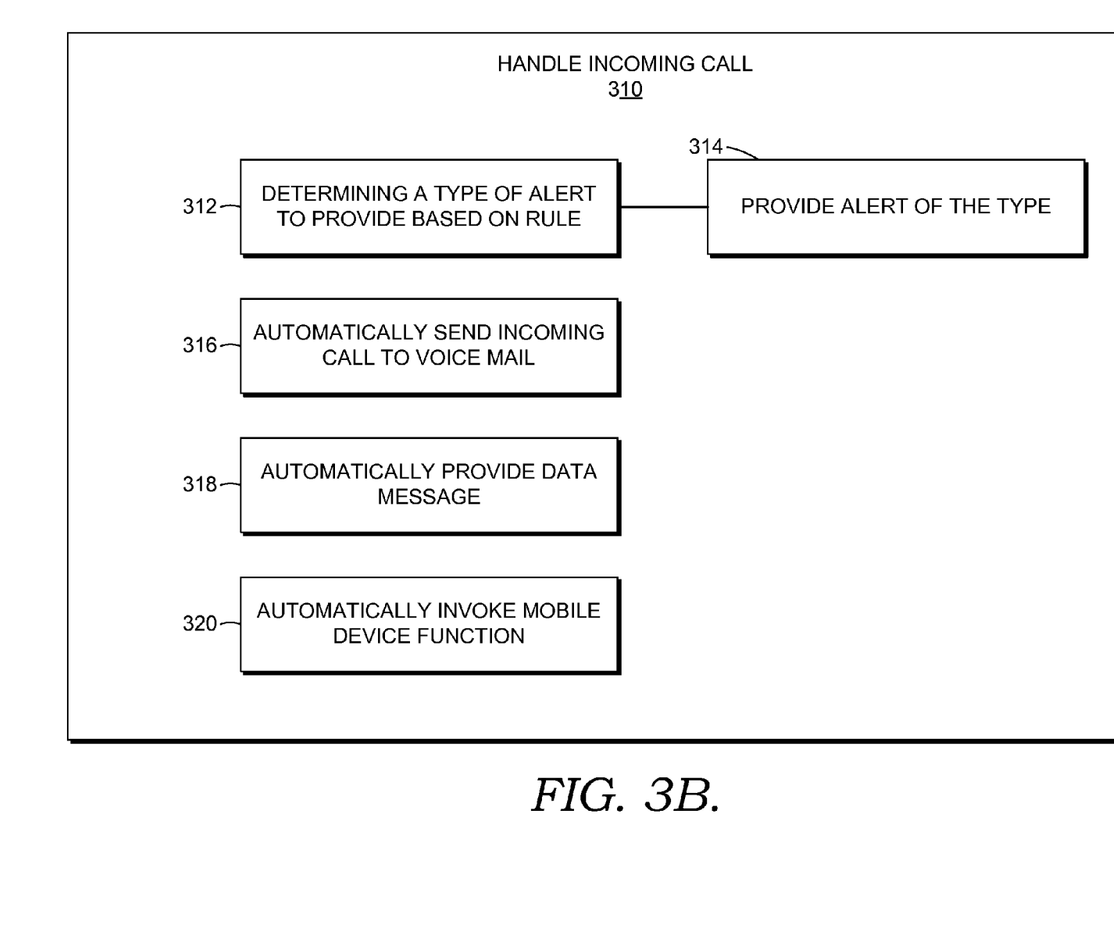
FIG. 3B is a block diagram depicting optional functions included in handling an incoming call in accordance with an embodiment of the invention.

With additional reference to FIG. 3B, optional functions included in handling an incoming call are described in accordance with an embodiment of the invention. By a first option, a rule instructs a mobile device to determine a type of alert to provide for a caller based on the rule and to provide that type of alert, as indicated at blocks 312 and 314. For example, a rule might indicate that calls from callers ranked 1-5 are to be provided with an audible alert such as a ring tone, while calls from callers ranked 6-N are to be provided with a silent alert (where N is an integer).

At a block 316, a rule instructs the mobile device to handle an incoming call by automatically sending the call to voice mail based on the caller's rank; e.g. calls from callers ranking greater than 100 are automatically sent to voice mail.

At a block 318, a data message is automatically provided in the handling of an incoming call. For example, the mobile device might send a text message to the caller indicating that the user of the mobile device is out of the office and providing a different number at which to contact the user directly when the caller is indicated as being ranked in the top 50 while callers ranked below the top 50 might receive a text message indicating another party to contact.

Additionally, the rule might instruct the mobile device to automatically invoke one or more functions, as indicated at a block 320. In an embodiment, the rule instructs the mobile device to block all calls from callers ranked below 100, to send calls from callers ranked 50-99 directly to voice mail, and to forward calls from callers ranked 1-49 to another number. In another embodiment, the rule applies to outgoing calls from the mobile device. For example, the rule instructs the mobile device to handle an outgoing call to a caller ranked below the top 50 by withholding the caller name of the user. Other functions of the mobile device can be employed in embodiments of the invention without departing from the scope described herein.

In an embodiment, more than one of the options depicted by blocks 312-320 are employed by a single rule. In another embodiment, multiple rules are applied to a single call and invoke one or more of the options depicted by blocks 312-320 or another option not described specifically herein.

Figure 3C:
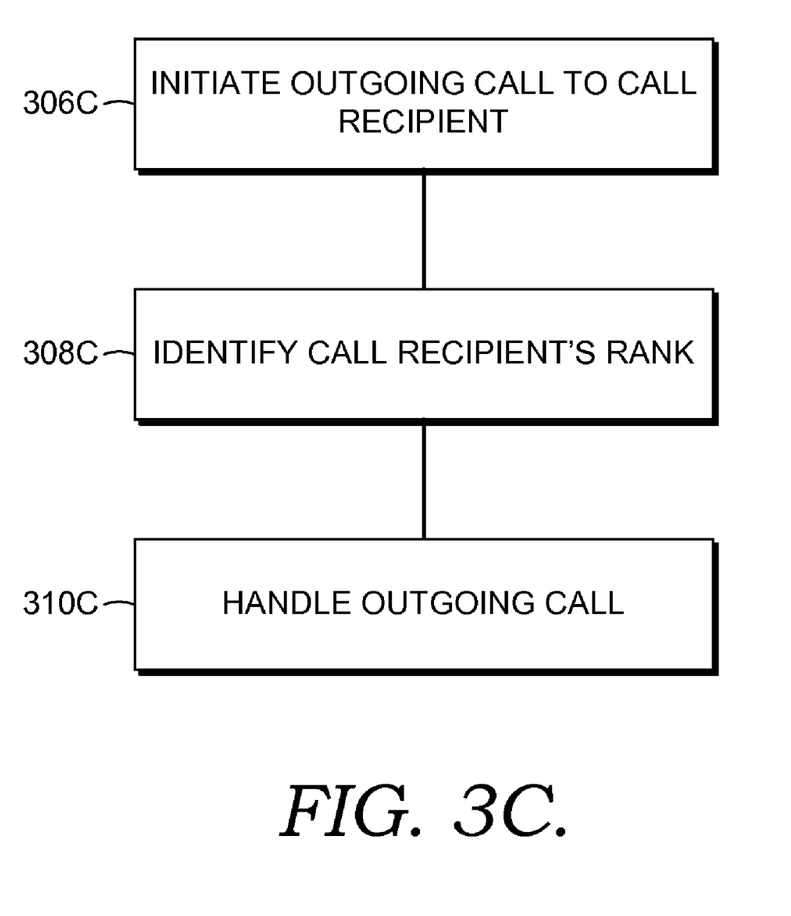
FIG. 3C is a block diagram depicting a method for invoking a rule for handling an outgoing call or message in accordance with an embodiment of the invention.

In another embodiment, the rule is applied to an outgoing call as depicted in FIG. 3C. Steps 302-304 of the method 300 are completed as described above. At a step 306C, an outgoing call is initiated on the mobile device by the user. The call recipient's rank is identified, at a step 308C. The mobile device handles the call as instructed by the rule, at a step 310C.

With continued reference to FIGS. 3A, 3B, and 3C, in an embodiment, one or more additional factors or characteristics are employed as criteria for applying a rule. In an embodiment, the mobile device determines a time of day when an incoming call is received. The time of day is used to inform handling of the call based on the rule where the rule instructs different handling of the call based on both the time of day and the caller's rank. For example, a rule might instruct that callers ranked 1-10 are always handled by providing an audible alert; callers ranked 11-50 are handled by providing an audible alert during business hours and a silent alert during non-business hours; and callers ranked 51-N or that are unranked are handled by providing a silent alert during business hours and automatically sending to voice mail during non-business hours. A variety of other factors and characteristics can be used.

Figure 4:
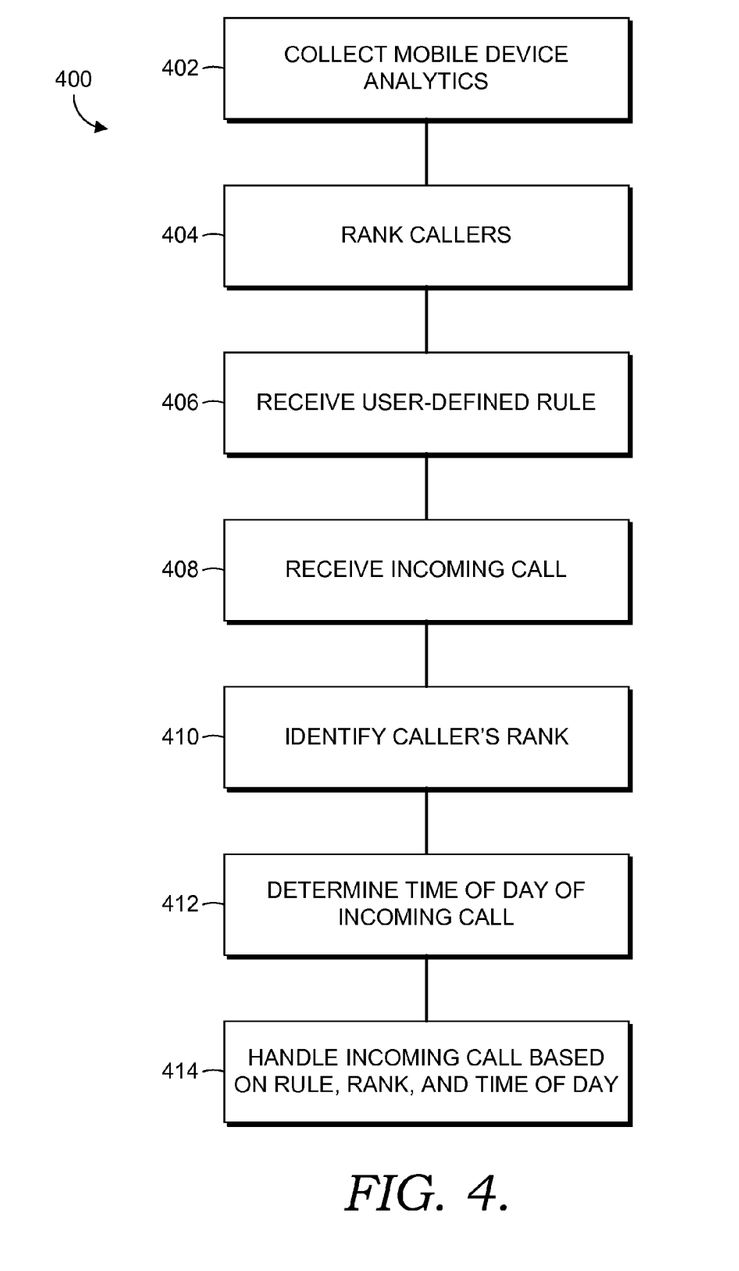
FIG. 4 is a block diagram depicting a method for using mobile device analytics to inform treatment of an incoming call or message based on a user-defined rule in accordance with an embodiment of the invention.

Referring now to FIG. 4A, a method 400 for using mobile device analytics to inform treatment of an incoming call or message based on a user-defined rule in accordance with an embodiment of the invention is described. At a step 402, mobile device analytics are collected by a mobile device for one or both of callers to the mobile device and call recipients from the mobile device. In an embodiment, the analytics are collected by an application residing on the mobile device. Callers are ranked based on at least a portion of the analytics, at a step 404 (as described previously, callers are inclusive of callers to the mobile device and call recipients from the mobile device). At a step 406, a user-defined rule is received at the mobile device. The rule instructs the mobile device how to handle calls to and from the mobile device based at least on the rank of the callers.

At a step 408, an incoming call is received and a rank of the caller associated with the incoming call is identified, at a step 410. A time of day of the incoming call is also determined, at a step 412. At a step 414, the mobile device handles the incoming call based on the rule with respect to the caller's rank and the time of day.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more tangible computer-readable media having computer-executable instructions embodied thereon that, when executed, perform a method for presenting mobile device analytics on a mobile device, the method comprising:
   in the mobile device, collecting the mobile device analytics related to calls received and made by the mobile device;
   storing at least a portion of the analytics in a memory of the mobile device;
   in the mobile device, ranking callers of the mobile device based on at least one of total number of calls and total call duration;
   in the mobile device, automatically transferring ones of the callers to voice mail when they call if their rank exceeds a threshold number; and
   presenting the rankings of the callers on the mobile device, wherein presenting the rankings of the callers comprises, in the mobile device, generating a graphical display that depicts calling patterns of the mobile device with respect to the callers, and displaying the graphical display on the mobile device.

2. The computer-readable media of claim 1, further comprising:
   linking the callers to an address book on the mobile device; and
   wherein presenting the rankings of the callers comprises presenting the rankings in the address book.

3. The computer-readable media of claim 1, further comprising:
   in the mobile device, dynamically assigning speed dial numbers to at least some of the callers based on the rankings.

4. The computer-readable media of claim 1, further comprising:
   in the mobile device, receiving one of an incoming call and an incoming message from one of the callers; and
   wherein presenting the rankings of the callers comprises automatically displaying the rank for the one of the callers.

5. One or more tangible computer-readable media having computer-executable instructions embodied thereon that, when executed, perform a method for presenting mobile device analytics on a mobile device, the method comprising:
   collecting the mobile device analytics, by the mobile device, wherein the mobile device analytics include data related to calls received and made by the mobile device, and wherein a call includes both voice and data communications;
   providing metrics to the mobile device;
   ranking, by an application executing on the mobile device, callers of the mobile device based on applying one or more of the metrics to one or more of the analytics, wherein the callers include inbound callers and outbound call recipients;
   presenting a ranking of the callers on the mobile device;
   identifying, based on the analytics, one or more features of a service that is not fully utilized by the mobile device, wherein the analytics indicate that a user of the mobile device is not using the one or more features correctly; and
   automatically presenting a tip on the mobile device that provides information about the feature.

6. The computer-readable media of claim 1, further comprising:
   in the mobile device, transferring the rankings to a communication network for delivery to a third party.

7. The computer-readable media of claim 6, wherein the third party comprises a social networking service.

8. The computer-readable media of claim 1, further comprising:
   in the mobile device, providing at least a portion of the analytics to a carrier network of the mobile device; and
   receiving from the carrier network, a promotion based at least partially on the analytics.

9. A mobile device to present mobile device analytics comprising:
   a memory storing an application;
   a processor configured to execute the application, wherein the executed application directs the processor to collect the analytics related to calls received and made by the mobile device, store at least a portion of the analytics in the memory, rank callers of the mobile device based on at least one of total number of calls and total call duration, automatically transfer ones of the callers to voice mail when they call if their rank exceeds a threshold number, present the rankings of the callers on the mobile device, and transfer the rankings to a communication network for delivery to a third party.

10. The mobile device of claim 9 wherein the executed application directs the processor to link the callers to an address book and present the rankings in the address book.

11. The mobile device of claim 9 wherein the executed application directs the processor to dynamically assign speed dial numbers to at least some of the callers based on the rankings.

12. The mobile device of claim 9 wherein the executed application directs the processor to drive a graphical display that depicts calling patterns of the mobile device with respect to the callers.

13. The mobile device of claim 9 wherein the executed application directs the processor to receive one of an incoming call and an incoming message from one of the callers and automatically display the rank for the one of the callers.

14. The mobile device of claim 9 wherein the third party comprises a social networking service.

15. The mobile device of claim 9 wherein the executed application directs the processor to provide at least a portion of the analytics to a carrier network of the mobile device and receive a promotion from the carrier network based at least partially on the analytics.

* * * * *